United States Patent
Kurtz

(10) Patent No.: US 7,189,378 B2
(45) Date of Patent: Mar. 13, 2007

(54) MINIATURE REACTION CHAMBER TEMPLATE STRUCTURE FOR FABRICATION OF NANOSCALE MOLECULAR SYSTEMS AND DEVICES

(75) Inventor: Anthony D. Kurtz, Ridgewood, NJ (US)

(73) Assignee: Kulite Semiconductor Products, Inc., Leonia, NJ (US)

(*) Notice: Subject to any disclaimer, the term of this patent is extended or adjusted under 35 U.S.C. 154(b) by 199 days.

(21) Appl. No.: 10/067,167

(22) Filed: Feb. 4, 2002

(65) Prior Publication Data

US 2003/0148065 A1    Aug. 7, 2003

(51) Int. Cl.
  *B81C 5/00*    (2006.01)
  *B01J 8/00*    (2006.01)
  *B01J 19/02*   (2006.01)

(52) U.S. Cl. .............. 422/191; 422/188; 422/189; 422/195; 422/240; 156/60; 156/87; 977/721; 977/712

(58) Field of Classification Search .......... 422/188, 422/189, 191, 192, 195, 240; 156/60, 87; 977/701, 712, 720, 721
See application file for complete search history.

(56) References Cited

U.S. PATENT DOCUMENTS 3,984,620 A * 10/1976 Robillard et al. .......... 174/52.4
4,078,604 A * 3/1978 Christl et al. ............. 165/133
4,392,362 A * 7/1983 Little ....................... 62/51.1
4,467,394 A * 8/1984 Grantham et al. ......... 361/283.4
5,644,395 A * 7/1997 Folta ........................ 356/246
5,690,763 A * 11/1997 Ashmead et al. ......... 156/60

OTHER PUBLICATIONS

"Scientists Find That Tiny Pipes Offer Big Payoffs", Kenneth Chang, The New York Times, Jan. 1, 2002, pp. 1-2.

* cited by examiner

*Primary Examiner*—Alexa D. Neckel
(74) *Attorney, Agent, or Firm*—Plevy, Howard & Darcy, PC

(57) ABSTRACT

A unique, micro-miniature reaction chamber template structure is disclosed for the fabrication of nanoscale molecular systems and devices. The structure is composed of multiple layers of silicon (either doped or intrinsic), Pyrex and various metals. The silicon may or may not be totally or partially covered with silicon dioxide. The Pyrex is chosen to be suitable for field-assisted bonding to silicon and the various metal layers are selected for their adherence to silicon or Pyrex, as well as their conductivity and their chemical reactivity. The basis structure may contain a number of tubes or fluidic pipes of varying cross sections. The structure consists of a layer of silicon bonded to a layer of Pyrex, which is in turn bonded to another layer of silicon and therefore, there is a composite structure which consists of a laminate of silicon glass and silicon. The glass is extremely thin and is Pyrex having sodium ions, which will be transported upon the application of a voltage to the structure to cause the sodium ions to be transported, leaving the dangling oxygen bonds in the glass or the silicon layers.

21 Claims, 7 Drawing Sheets

MINIATURE REACTION CHAMBER TEMPLATE STRUCTURE FOR FABRICATION OF NANOSCALE MOLECULAR SYSTEMS AND DEVICES

FIELD OF INVENTION

This invention relates to molecular systems and devices and, more particularly, to a unique micro-miniature reaction chamber template structure utilized to fabricate such devices.

BACKGROUND OF THE INVENTION

As one can ascertain, conventional electronics have fundamental limitations in regard to size, speed and so on. Many prominent scientific centers are working on utilizing molecules to provide an alternative for electronic processors. The use of molecules will result, obviously, in extremely small structures, which theoretically are capable of high operating speeds. Thus, the term molecular transistor has been utilized. In regard to such techniques, many centers have been utilizing gallium arsenide, as well as aluminum gallium arsenide with contacts with molecules disposed on the surface of such devices. Essentially, they are using new molecules and old semiconductor devices to try to produce new components. Thus, such researchers have proposed a molecular field effect transistor designated as MOLSET. This is basically a molecular tripod where the molecules form gate, source and drain electrodes with extremely small dimensions such as a spacing of 35 Angstroms between the source and drain and between the source and gate.

The art is in its infancy, as one can ascertain. For example, see an article in the *New York Times*, Jan. 1, 2002 entitled, "Scientists Find that Tiny Pipes Offer Big Payoffs". This article discusses new technology known as microfluidics. This technology then utilizes silicon tubes, which are used to pump fluid in various directions and essentially operate like valves and so on.

It is an objective to provide a unique micro-miniature template structure for the fabrication of nanoscale molecular systems and devices.

SUMMARY OF INVENTION

The structure contemplated is composed of multiple layers of silicon, which are either doped or intrinsic, borosilicate glass (Pyrex) and various metals. Silicon may or may not be partially or totally covered with silicon dioxide. The Pyrex is chosen to be suitable for field assisted bonding to silicon and the various metal layers are selected for their adherence to silicon or Pyrex, as well as their conductivity and chemical reactivity.

The basic structure is made to contain a number of tubes or fluidic pipes of varying cross sections in which a portion of the cross section is formed in the silicon and a second portion of the cross section may be formed in the Pyrex. It is also within the scope of this invention to form the cross section in two pieces of silicon separated by a thin layer of Pyrex. In any event, the use of field assisted bond between silicon and Pyrex makes the use of sodium ion transport in the Pyrex during the bonding process and it is possible by shaping the Pyrex layer to leave internal conductive paths. It is also possible to leave in the Pyrex oxygen ions at the surface that were previously linked to the sodium ions, but can now be exposed for attachment to various organic molecules.

The use of various planes of the silicon structure makes it possible to obtain cavities of differing shapes during etching depending on the crystallographic orientation of the chosen planes. In addition, the extent of etching can also be controlled by the use of degenerately doped silicon layers and the conductivity selective etch. Moreover, the use of a particular crystallographic plane makes possible the construction of sharp edges for a localized high electric field. It is clear that specific areas of the silicon can be chosen to have dangling bonds to promote localized reactions enabling a nanostructure to form in a specific spot within the reaction chamber. Such localized reaction areas may also be formed using various layers of metal on either the silicon or the glass structure. In addition, the various fluidic pipes can also be formed if so desired at right angles to the main fluidic pipes enabling the injection of liquids at varying places within the reaction chamber structure.

If the field assisted bonding is performed in either a vacuum (or an inert atmosphere), the dangling oxygen bonds are exposed after the two layers are joined. After the voltage is lowered and the temperature is reduced to room ambient, various fluids can be introduced through the right angle conduit and allowed to reach the dangling oxygen bonds (or other localized metal surfaces) to allow the reaction to proceed at the desired places. Reaction of an appropriate voltage can also (by means of the highly localized electric fluid) cause the reaction to terminate at the junction.

DETAILED DESCRIPTION OF THE FIGURES

Figure 1:
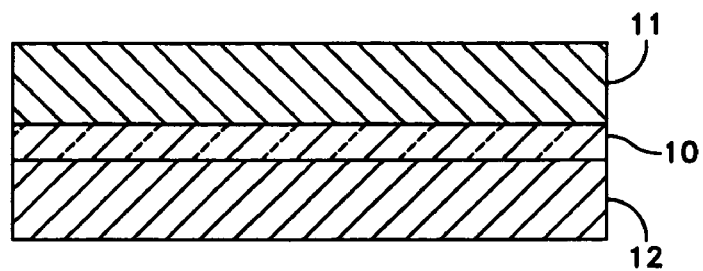
FIG. 1 is an enlarged diagram in cross sectional view of a micro-miniature reaction chamber template according to this invention.

Referring to FIG. 1, there is shown an example of a basic structure according to this invention. In FIG. 1 a layer of silicon 11 is bonded to a layer of borosilicate (Pyrex) glass 10, which in turn is bonded to a another layer of silicon 12. The silicon is bonded to the Pyrex layer 10 by means of a field-assisted bond. The field-assisted bond is formed by applying pressure between the silicon and the Pyrex under the influence of a voltage, which causes the silicon molecules to migrate into the glass molecules, forming a strong bond. As one knows, Pyrex glass contains sodium and the use of Pyrex for layer 10 makes the use of sodium ion transport during the bonding process to bond to the silicon. One can also shape the Pyrex layer 10 so that one can form internal conducting paths. Thus, FIG. 1 the two pieces of silicon 11 and 12 separated by a center portion, which is a thin layer of Pyrex 10.

Figure 2:
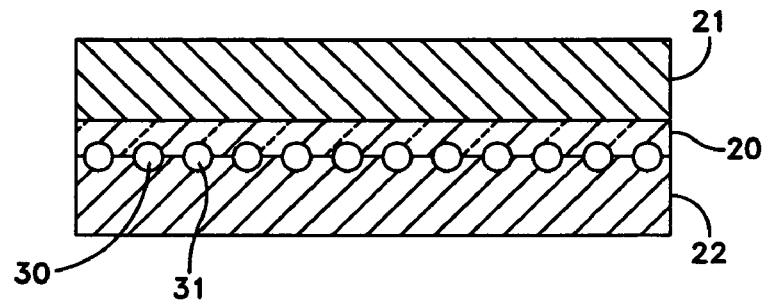
FIG. 2 shows the template of FIG. 1 utilizing micropipes.

Referring to FIG. 2, there is shown the structure of FIG. 1, which includes a top layer of silicon 21, a bottom layer of silicon 22 and a layer of Pyrex 20. In the layer of Pyrex 20 there is shown a plurality of microtubes as 30 and 31. These microtubes are formed by etching or other processing of the glass, which is well known. It is also understood that such microtubes can also be formed in the silicon by etching the similar products. The microtubes are pipes or channels between 1 to 10 mils in diameter and can be produced by active ion etching. In this manner, fluids containing molecules can be injected into the microtubes 30. It is also envisioned that there will be an X-Y matrix of microtubes whereby each of the microtubes form an X-Y grid and therefore fluids can be injected at any point in X-Y grid to enable a fluid to reach a cross point or a local area. At this local area, there would be a small spot or opening. At this spot, there would be dangling oxygen bonds. These dangling oxygen bonds are, of course, utilized to enable one now to couple organic molecule to the dangling oxygen bonds so as to utilize the structure shown in FIGS. 1 and 2 as a template for connecting organic molecules to the silicon structure. One can therefore produce organic devices, such as electronic devices or other conducting devices. The organic molecules that can be employed would be molecules like biphenyldithiol and biphenydiamine, as well as diphenyls. Such compounds are soluble in alcohol and ether and are used in organic synthesis. Therefore, the fluids that can be used to transport these compounds are alcohol and ether as well as other solvents. In any event, the important aspect of the invention is that one utilizes Pyrex with various layers of silicon structures. The use of Pyrex enables the transport of sodium ions and Pyrex oxygen ions at the surface that were previously linked to sodium ions are now exposed so they can be attached to various organic molecules.

Figure 3:
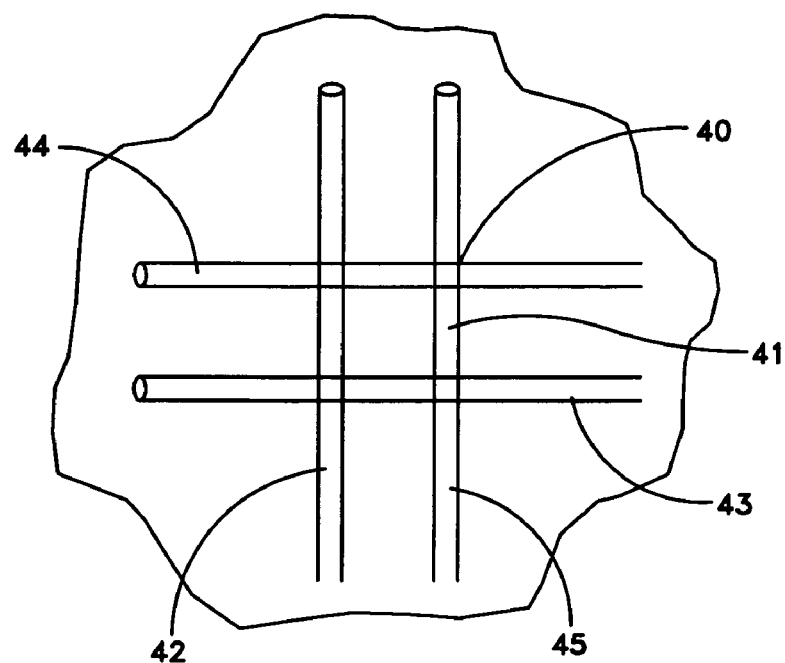
FIG. 3 is an extremely enlarged view of a vertical and horizontal array of micropipes forming an X-Y matrix to provide localized reaction sites at the cross points of the matrix.

Referring to FIG. 3 there is shown an extremely enlarged view of a series of micropipes, which are formed in the Pyrex or the silicon. As we can see, there are micropipes 42 and 45, which are oriented in the vertical direction with micropipes 43 and 44 oriented in the horizontal direction. The intersection between pipes 44 and pipe 45 creates a cross point 40, which is a localized area in the glass or silicon, where fluid can be introduced into the pipe. At the localized area, the molecule will exist and by the use of electric fields or other devices, one can now cause the migration of sodium ions and therefore produce oxygen ions which are dangling at that location. One can now attach a molecule for a specific spot on the silicon structure as shown in FIGS. 1 and 2. It is understood that FIG. 3 is an enlarged view and the matrix contains thousands of micropipes developed in the structures of FIGS. 1 and 2.

Referring to FIG. 3 there is shown an extremely enlarged view of a series of micropipes, which are formed in the Pyrex or the silicon. As we can see, there are micropipes 41, 42 and 45, which are oriented in the vertical direction with micropipes 43 and 44 oriented in the horizontal direction. The intersection between pipe 44 and pipe 45 creates a cross point 40, which is a localized area in the glass or silicon, where fluid can be introduced to the pipe. At the localized area, the molecule will exist and by the use of electric fields or other devices, one can now cause the migration of sodium ions and therefore produce oxygen ions which are dangling at that location. One can now attach a molecule for a specific spot on the silicon structure shown as FIGS. 1 and 2. It is understood that FIG. 3 is an enlarged view and the matrix contains thousands of micropipes developed in the structures of FIG. 1 and FIG. 2.

Figure 4A:
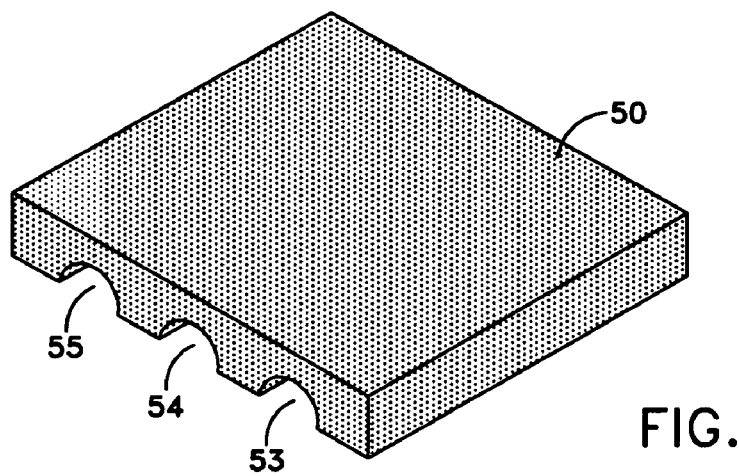
FIG. 4 consists of FIGS. 4A, 4B and 4C and basically shows a wafer of Pyrex which is eventually bonded to a wafer of silicon to form a composite structure as shown in FIG. 4C.
Figure 4B:
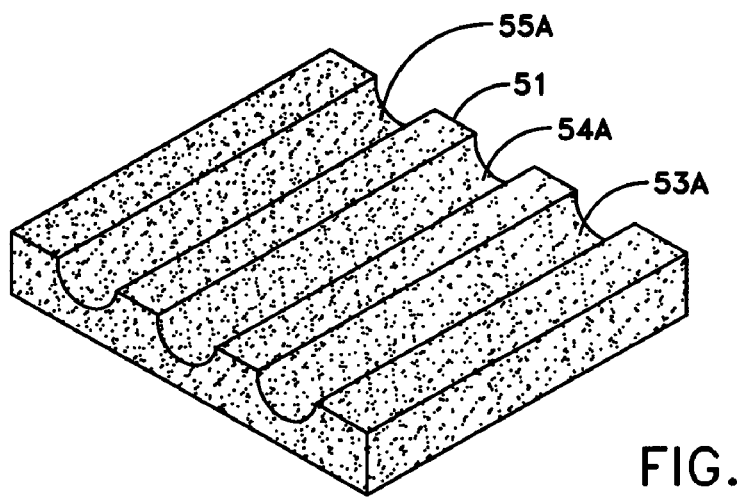
Figure 4C:
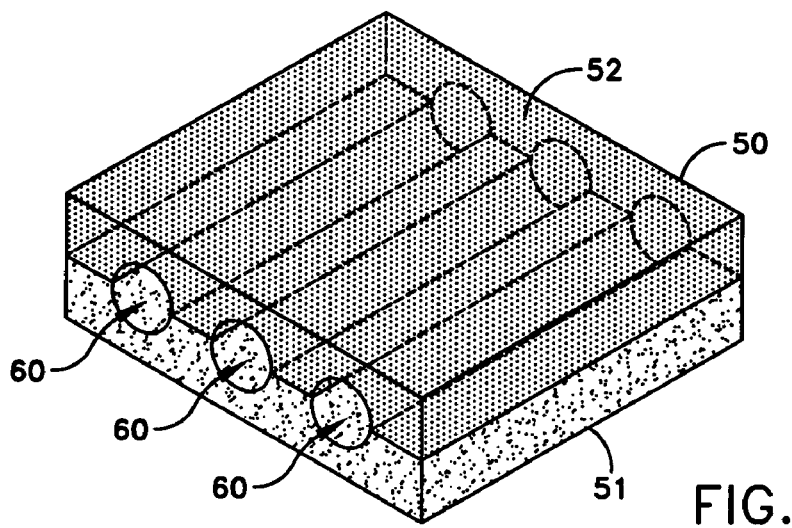

FIG. 4 consists of FIGS. 4A, 4B and 4C and basically shows a wafer of Pyrex which is eventually bonded to a wafer of silicon to form a composite structure as shown in FIG. 4C.

Figure 5A:
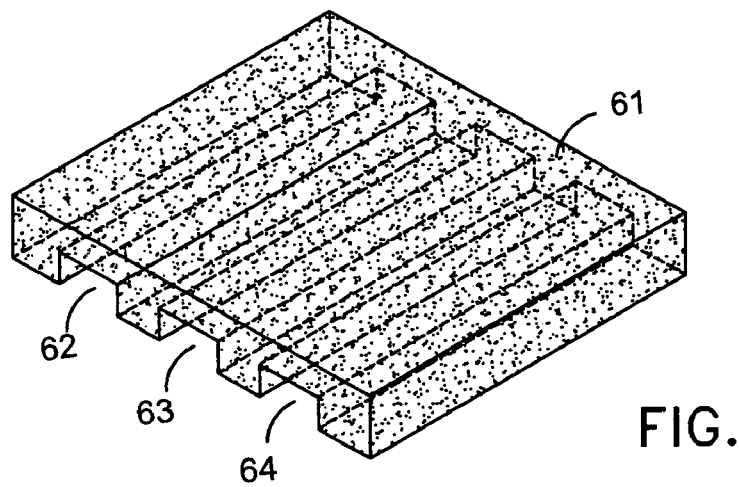
FIG. 5 consists of FIGS. 5A, 5B and 5C which basically shows a top wafer of silicon which is bonded to a bottom wafer of silicon coated with Pyrex to form a composite structure shown in FIG. 5C. It is noted that in FIG. 5 the co-apertures are rectangular in shape rather than circular as shown in FIG. 4.
Figure 5B:
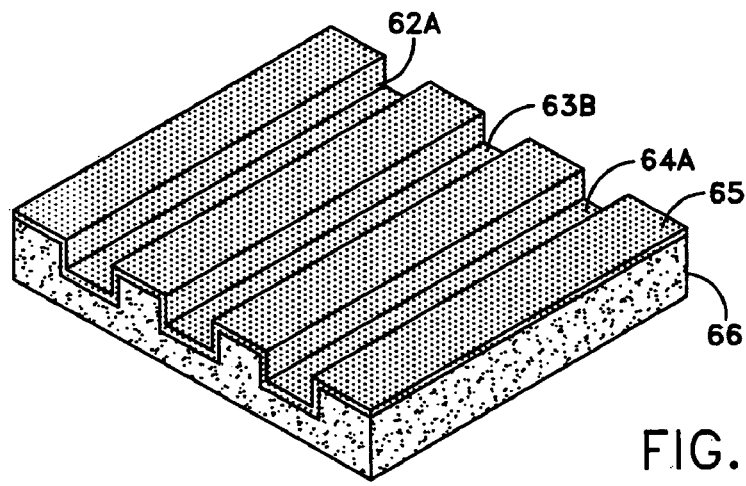
Figure 5C:
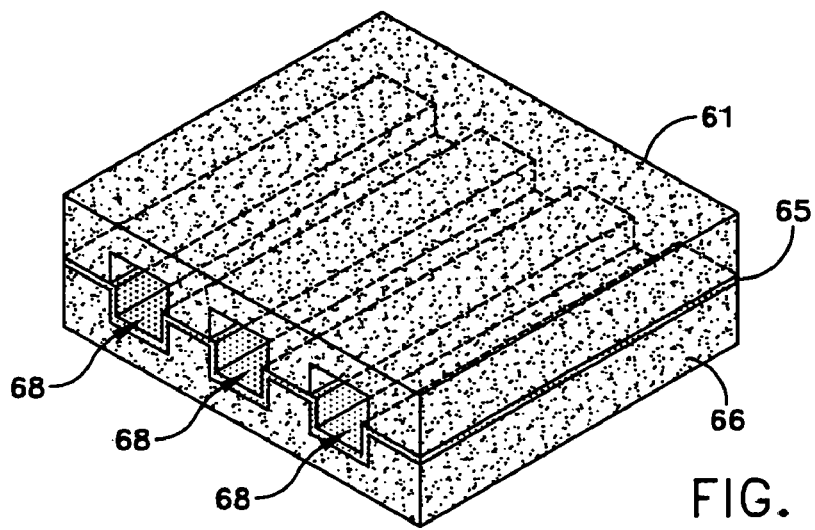

Referring to FIG. 5, which consists of FIGS. 5A, 5B and 5C, is shown an alternate embodiment of a micro-miniature reaction chamber template circuit according to this invention. FIG. 5A shows a top wafer which is fabricated from silicon. The wafer 61 has rectangular channels or micropipes 62, 63 and 64 which are directed from one side of the wafer to the other side of the wafer. FIG. 5B shows another silicon wafer 66, which is coated with Pyrex glass 65. The Pyrex glass 65 is bonded to or otherwise deposited on the silicon wafer 66 and has corresponding channels 64A, 63B and 62A. FIG. 5C shows the top wafer of FIG. 5A bonded to the Pyrex layer 65, thus having a silicon wafer separated by a Pyrex layer 65 bonded to another silicon wafer 66. There are three channels or pipes 68, which are directed from one side to the other side, where each through channel can accommodate a fluid flow, as described above.

Figure 6A:
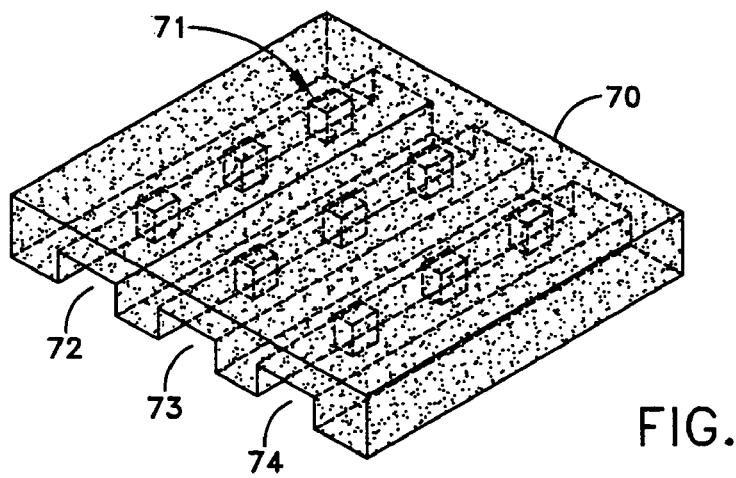
FIG. 6 consists of FIGS. 6A, 6B and 6C and shows an alternate embodiment of a coated silicon wafer using vertical conduits to enable fluid placement.
Figure 6B:
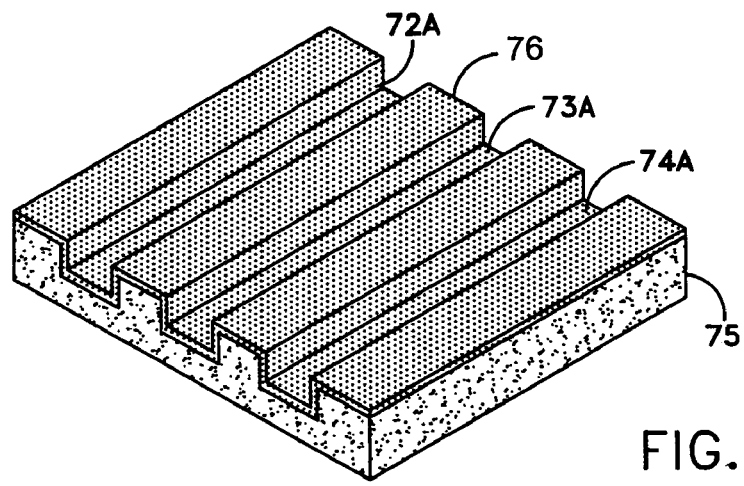
Figure 6C:
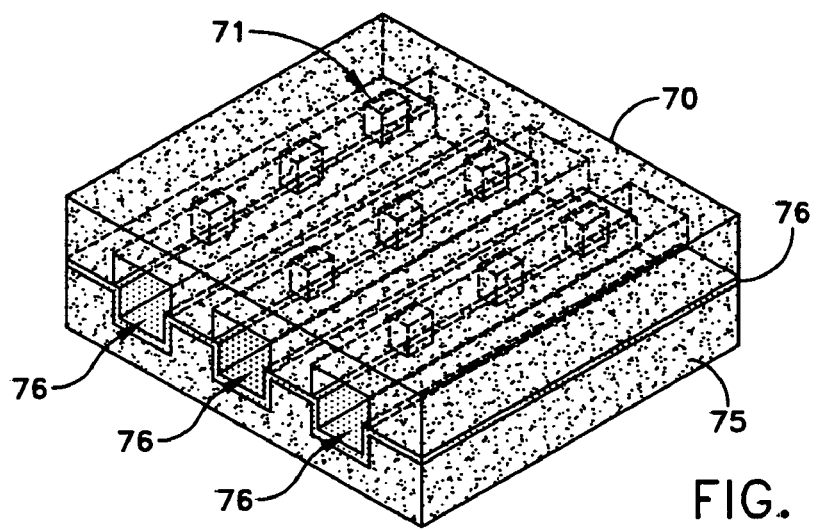

Referring to FIG. 6, which consists of FIGS. 6A, 6B and 6C, there is shown in FIG. 6A a top wafer 70 fabricated from silicon. The wafer 70 again has semi-rectangular channels 72, 73 and 74. Each channel is associated a plurality of vertical conduits, where the fluid can be introduced on the top of the channels, as well as through the pipes to be formed. Shown in FIG. 6B is a wafer of silicon 75 coated with a layer of Pyrex 76 and having corresponding channel 74A, 73A and 72A. FIG. 6C shows the top wafer 70 secured to the bottom wafer 75 at the Pyrex layer by an electro-assisted bond. As one can see a molecule containing fluid can be introduced through the vertical conduits 71 to flow into the pipes 76 as shown in FIG. 6C.

Figure 7A:
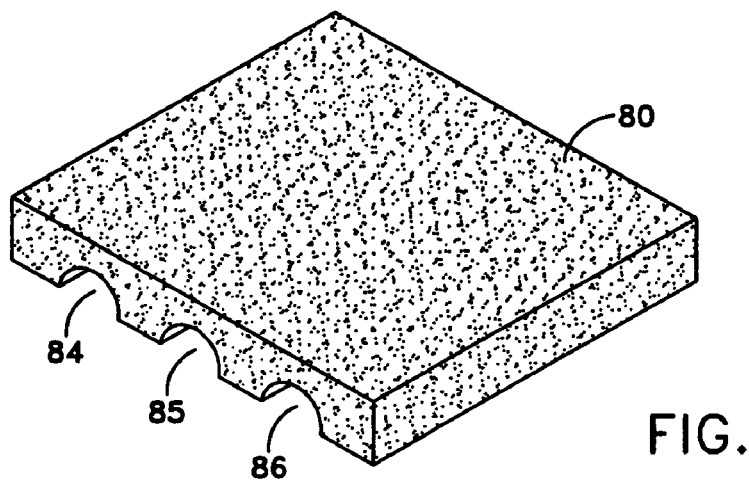
FIG. 7 consists of FIGS. 7A, 7B and 7C and again shows a top wafer of silicon bonded to a wafer of silicon which is coated with Pyrex having pipes or micropipes for enhancing reactions.
Figure 7B:
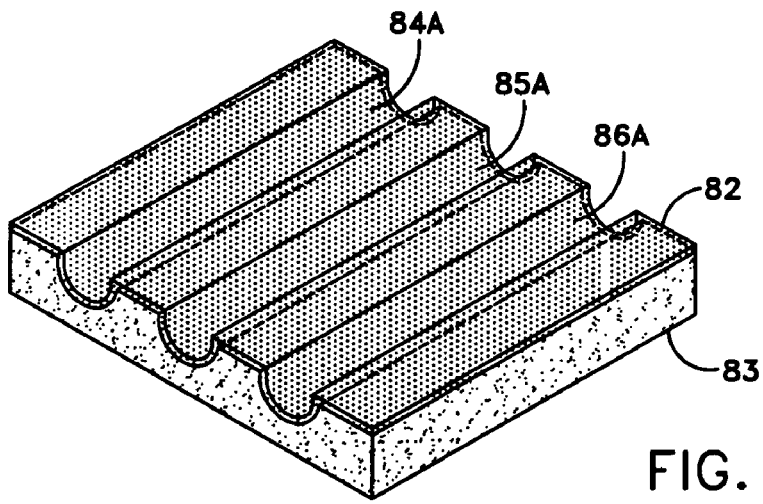
Figure 7C:
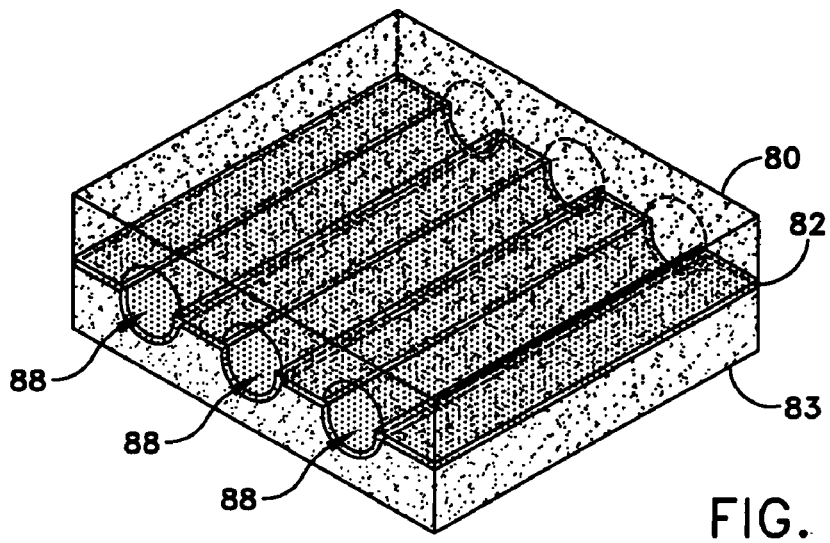

Referring to FIG. 7 which consists of FIGS. 7A, 7B and 7C, there is shown a top wafer 80 of silicon having semi-circular apertures 84, 85 and 86 directed from one side of the wafer to the other side of the wafer. FIG. 7B shows a bottom wafer of silicon 83 which is covered with a layer of Pyrex 82 which is deposited on the silicon. The silicon wafer 83 depressions 86A, 85A and 84A, which are aligned with depressions 84, 85 and 86. The top wafer 80 is bonded to Pyrex layer 82 which is bonded to silicon layer 83 to form the structure shown in FIG. 7C. The through holes 88 or pipes are formed as above.

Figure 8A:
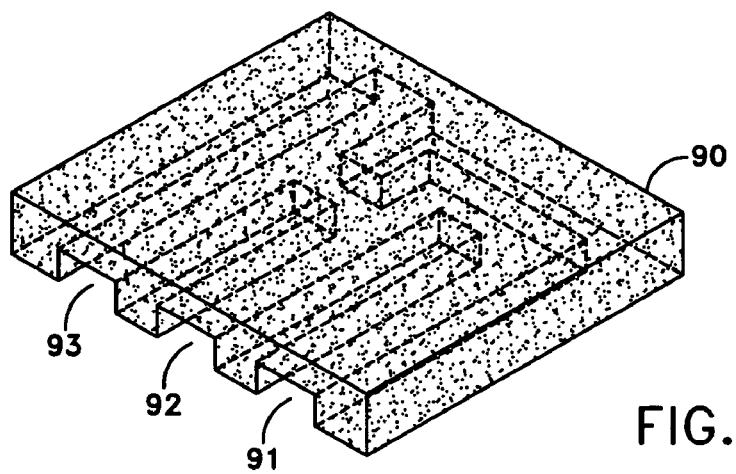
FIG. 8 consists of 8A, 8B and 8C and basically shows a top wafer of silicon secured to a wafer of silicon coated with Pyrex and which has alternate channel configurations disposed throughout.
Figure 8B:
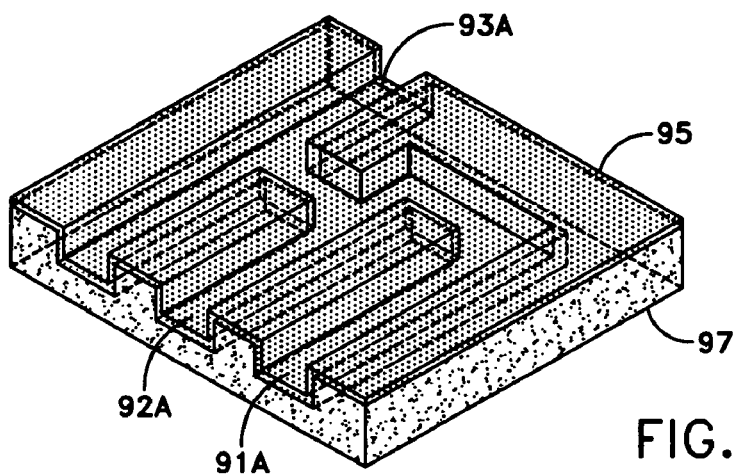
Figure 8C:
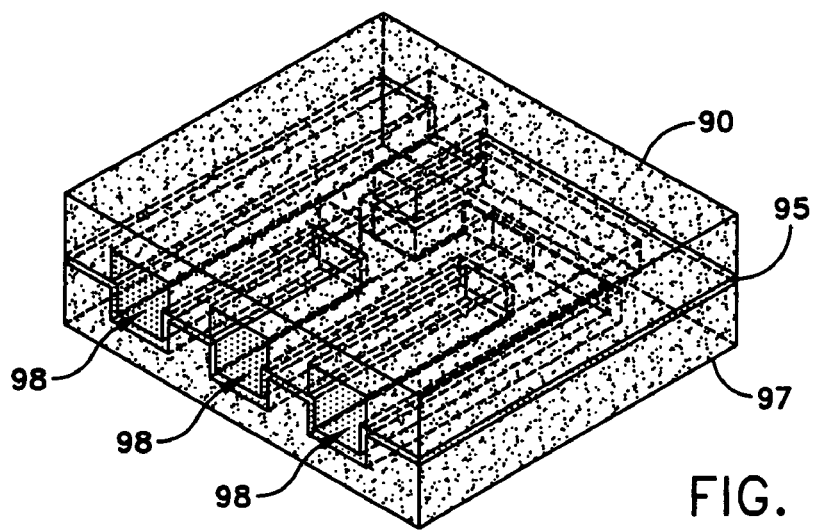

Referring to FIG. 8, which consists of FIGS. 8A, 8B and 8C, there is shown again a wafer of silicon 90. In this instance there are channels 91, 92 and 93, which channels are not through channels, with the exception, for example, of channel 93, but provide areas in which an organic fluid can flow. FIG. 8B shows a bottom wafer of silicon 97 coated with Pyrex glass to form corresponding channels 91A, 92A and 93A. FIG. 8C shows the top wafer 90 joined to the bottom wafer 91 via the Pyrex layer 95. It is seen from FIG. 8 that all the channels are not through channels, but are channels which are used to circulate fluid in any desired manner through the structure. However, there is a through path from one end to the other as from 91A and 92A to 93A.

Figure 9A:
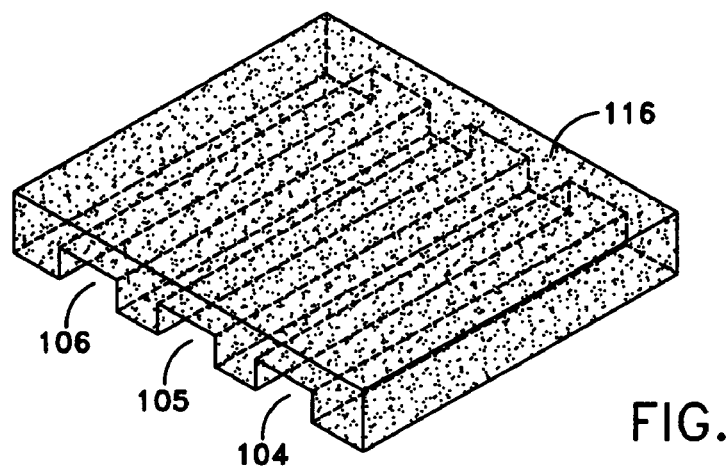
FIG. 9 consists of 9A, 9B and 9C and basically shows a device according to this invention whereby the devices uses localized sharp pointed reaction areas disposed along the through channels to enable higher voltage reactions to occur at the tips of the pointed reaction areas.
Figure 9B:
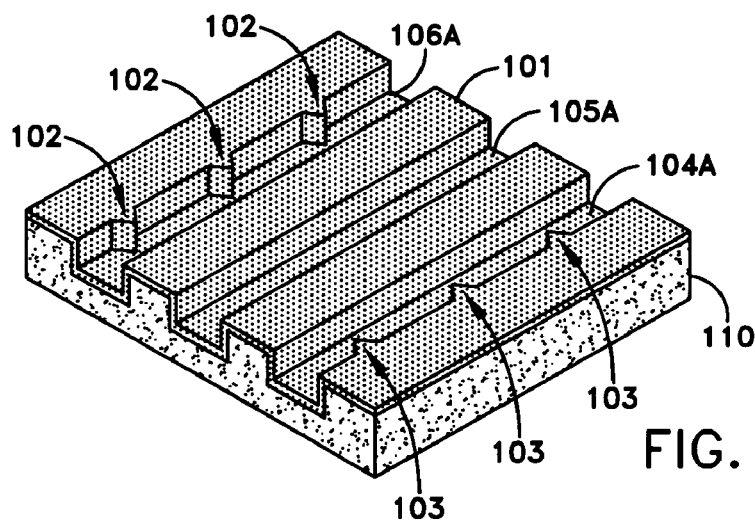
Figure 9C:
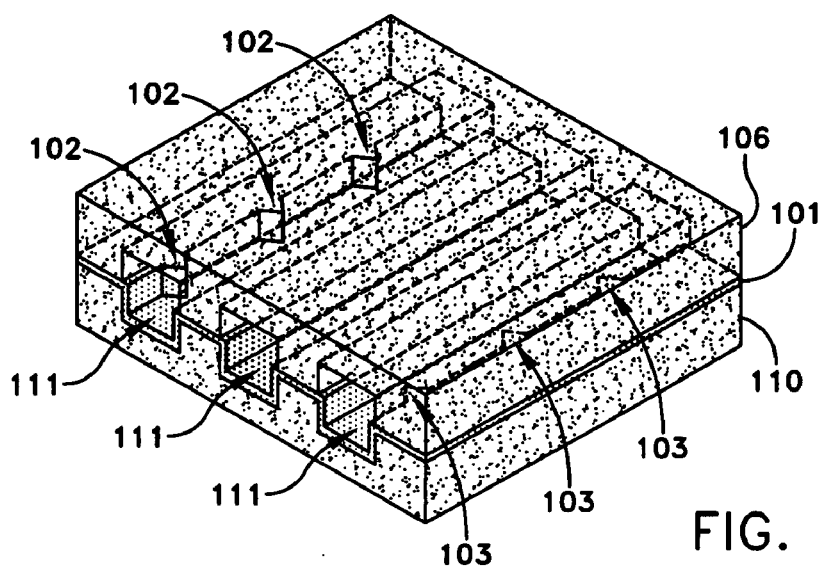

Referring to FIG. 9 which consists of FIG. 9A, 9B and 9C, there is shown in FIG. 9A a silicon wafer 116 having through channels 104, 105 and 106. Shown in FIG. 9B is another silicon wafer 110 having a Pyrex layer 101 deposited thereon. The silicon wafer 110 has corresponding channels 104A, 105A and 106A. Each channel has localized high field reaction areas designated by 102 and 103. These high field reaction areas are basically points which are tips which are directed along apertures as 106A and 104A, and which will produce high electric fields where the voltage is applied between the silicon and Pyrex between the wafer. These high electric fields which are produced at the tips will enable the efficient reaction areas to occur at the localized tip areas, plus each of the tips as 102 and 103 terminates in a sharp point. As one can understand, when a voltage is applied between the chips, the sharp points will basically create high voltage fields, which are localized and whereby reactions can take place as indicated above.

It is also understood that localized reaction areas may also be formed using layers of metal under the silicon or the glass structure. The layers of metal can be, for example, layers of aluminum, gold, and so on. These metal layers can also be formed into pipes, and therefore provide reaction areas.

What is claimed is:

1. A miniature reaction chamber template structure for fabricating a nanoscale molecular system, comprising:
    a first wafer of silicon,
    a layer of borosilicate glass having oxygen ions at a surface thereof and being at least substantially adjacent to said wafer of silicon to form a composite structure, and
    a plurality of channels, located between said glass and silicon interface, defining a plurality of reaction sites where said channels intersect, and having dangling bonds formed non-uniformly including at least at said reaction sites for coupling to organic molecules to fabricate the nanoscale molecular system, and
    an inlet opening for said channels at one end of said structure and an outlet opening for said channels at another end of said structure to enable the insertion of a fluid containing the organic molecules in said channels.

2. The miniature reaction chamber according to claim 1 wherein said channels are located longitudinal to said structure and are directed from a first side to a second side in the X direction.

3. The miniature reaction chamber according to claim 2 where in there are additional channels located in the Y direction and which are transverse to the X direction channels.

4. The miniature reaction chamber according to claim 1 further including a second wafer of silicon at least substantially adjacent to said borosilicate glass layer to form a laminar structure having a top layer of silicon, a middle layer of borosilicate glass and a bottom layer of silicon.

5. The miniature reaction chamber according to claim 1 wherein said channels are circular in cross section.

6. The miniature reaction chamber according to claim 1 wherein said channels are rectangular in cross section.

7. The miniature reaction chamber according to claim 4 wherein said borosilicate glass is deposited on said second silicon wafer.

8. The miniature reaction chamber according to claim 1 wherein said borosilicate glass is joined to said first silicon wafer by a field assisted bond.

9. The miniature reaction chamber according to claim 8 wherein said field assisted bond creates said oxygen ions in the borosilicate glass.

10. The miniature reaction chamber according to claim 4 further including vertical conduits located in said top layer of silicon and in communication with said channels to enable a fluid to be introduced into said channels.

11. The miniature reaction chamber according to claim 10 further including localized reaction areas positioned in said channels and capable of producing a high electric field wherein a voltage is applied to said structure.

12. The miniature reaction chamber according to claim 1 wherein said channels include a metallized layer area.

13. The miniature reaction chamber according to claim 1 wherein said channels are between 1 to 10 mils in diameter.

14. The miniature reaction chamber according to claim 1 wherein said silicon is doped silicon.

15. The miniature reaction chamber according to claim 1 wherein said silicon is intrinsic silicon.

16. The miniature reaction chamber according to claim 1 wherein said silicon wafer is coated with silicon dioxide.

17. The miniature reaction chamber according to claim 12 wherein said metal is selected from aluminum or gold.

18. The miniature reaction chamber according to claim 1, wherein at least one of said channels contains the fluid containing the organic molecules, wherein the organic molecules react with said dangling bonds at at least one of said reaction sites and generate a nanoscale molecular system.

19. An apparatus for fabricating a nanoscale molecular system using organic molecules, comprising:
    at least one silicon wafer;
    a layer of borosilicate glass being substantially adjacent to said silicon wafer to define a plurality of channels between said borosilicate glass and silicon wafer, said borosilicate glass having dangling bonds formed non-uniformly including at least at intersections of at least two of said channels and providing localized reaction sites for receiving the organic molecules; and,
    at least one inlet opening for said channels for enabling the insertion of a fluid containing the organic molecules to be fabricated into the nanoscale molecular system into said channels.

20. The apparatus of claim 19, wherein said dangling bonds are associated with oxygen ions.

21. An apparatus for fabricating nanoscale molecular systems, comprising:
    at least one silicon wafer;
    a layer of borosilicate glass being substantially adjacent to said silicon wafer to define a plurality of channels between said borosilicate glass and silicon wafer;
    at least one inlet opening for said channels for enabling the insertion of a fluid containing organic molecules into said channels; and,
    at least one edge protruding into at least one of said channels and being suitable for inducing a localized high electric field.

* * * * *